United States Patent
Kona

(10) Patent No.: US 10,807,419 B2
(45) Date of Patent: Oct. 20, 2020

(54) PRESSURE SUPPLY DIAGNOSTICS AND CONTROLS AND THE TIRE INFLATION SYSTEM MADE THEREWITH

(71) Applicant: Dana Heavy Vehicle Systems Group, LLC, Maumee, OH (US)

(72) Inventor: Venkata Ramakanth Kona, Maumee, OH (US)

(73) Assignee: DANA HEAVY VEHICLE SYSTEMS GROUP, LLC, Maumee, OH (US)

(*) Notice: Subject to any disclaimer, the term of this patent is extended or adjusted under 35 U.S.C. 154(b) by 232 days.

(21) Appl. No.: 15/956,304

(22) Filed: Apr. 18, 2018

(65) Prior Publication Data

US 2018/0304701 A1 Oct. 25, 2018

Related U.S. Application Data

(60) Provisional application No. 62/487,826, filed on Apr. 20, 2017.

(51) Int. Cl.
*B60C 23/00* (2006.01)
*B60C 23/04* (2006.01)

(52) U.S. Cl.
CPC ........ *B60C 23/003* (2013.01); *B60C 23/0474* (2013.01); *B60C 23/0481* (2013.01)

(58) Field of Classification Search
None
See application file for complete search history.

(56) References Cited

U.S. PATENT DOCUMENTS

| | | | |
|---|---|---|---|
| 7,089,099 B2* | 8/2006 | Shostak | B60C 23/005 |
| | | | 701/29.6 |
| 7,481,453 B2* | 1/2009 | Breed | B60N 2/0232 |
| | | | 280/738 |
| 9,522,577 B2* | 12/2016 | Dilisio | B60C 23/003 |
| 10,160,269 B2* | 12/2018 | Staedele | B60C 23/003 |
| 10,315,469 B2* | 6/2019 | Coombs | B60C 23/003 |
| 2019/0359196 A1* | 11/2019 | Engelbert | B60C 23/20 |

* cited by examiner

*Primary Examiner* — Natalie Huls
*Assistant Examiner* — Jermaine L Jenkins
(74) *Attorney, Agent, or Firm* — McCoy Russell LLP

(57) ABSTRACT

A method of determining tire pressure includes providing a control unit having a first pressure transducer. The control unit is in fluid communication with a fluid reservoir via an air supply circuit. A second pressure transducer is disposed at least partially within the fluid reservoir. The method also includes measuring a pressure of air in the air supply circuit utilizing the first pressure transducer and measuring a pressure of air in the reservoir utilizing the second pressure transducer. The method additionally includes determining a difference in the measurements of the first pressure transducer and the second pressure transducer and calibrating the second pressure transducer pressure measurement to agree with the first pressure transducer pressure measurement where the pressure difference is less than a predetermined value. The method further includes measuring a pressure in one or more tires.

7 Claims, 3 Drawing Sheets

PRESSURE SUPPLY DIAGNOSTICS AND CONTROLS AND THE TIRE INFLATION SYSTEM MADE THEREWITH

BACKGROUND

The present disclosure relates to tire inflation systems and to a pressure supply control system.

Tire inflation systems for vehicles provide a vehicle the versatility of adjusting tire pressures while the vehicle is stationary or in motion. For example, the tire pressure of one or more wheel assemblies in fluid communication with a tire inflation system may be decreased to increase tire traction, or increased to reduce rolling resistance and increase the vehicle's fuel efficiency and tire longevity. Furthermore, tire inflation systems increase a vehicle's maneuverability over differing terrains and increase a vehicle's mobility through varying environmental conditions. Additionally, tire inflation systems reduce maintenance requirements.

Legacy tire inflation systems experience performance limitations during tire inflate. The present disclosure provides for a tire inflation system with increased inflate performance.

SUMMARY

In an embodiment, the present disclosure provides for a method of determining tire pressure that includes providing a control unit having a first pressure transducer. The control unit is in fluid communication with a fluid reservoir via an air supply circuit. A second pressure transducer is disposed at least partially within the fluid reservoir. The method also includes measuring a pressure of air in the air supply circuit utilizing the first pressure transducer, and measuring a pressure of air in the reservoir utilizing the second pressure transducer. The method additionally includes determining a difference in the measurements of the first pressure transducer and the second pressure transducer, and calibrating the second pressure transducer pressure measurement to agree with the first pressure transducer pressure measurement where the pressure difference is less than a predetermined value. The method further includes measuring a pressure in one or more tires.

In another embodiment, the present disclosure provides for a method of tire inflation including providing a control unit having a first pressure transducer, wherein the control unit is in selective fluid communication with one or more tires. The control unit is in fluid communication with a fluid reservoir via an air supply circuit. A second pressure transducer is disposed at least partially within the fluid reservoir. The method also includes determining a first pressure in the fluid reservoir necessary to operate a braking system, and determining a second pressure in the fluid reservoir to account for a hysteresis band in measurements of the first and second pressure transducers. The method additionally includes calculating a third pressure via summing the first and second pressures, and determining whether the fluid reservoir pressure is greater than the third pressure. The method further includes determining a virtual pressure switch OPEN and CLOSED threshold values where no check valve fault has been set, and determining a virtual pressure switch status for each one or more tires. The method also includes inflating each one or more tires having a CLOSED virtual pressure switch status.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

DETAILED DESCRIPTION

Figure 1:
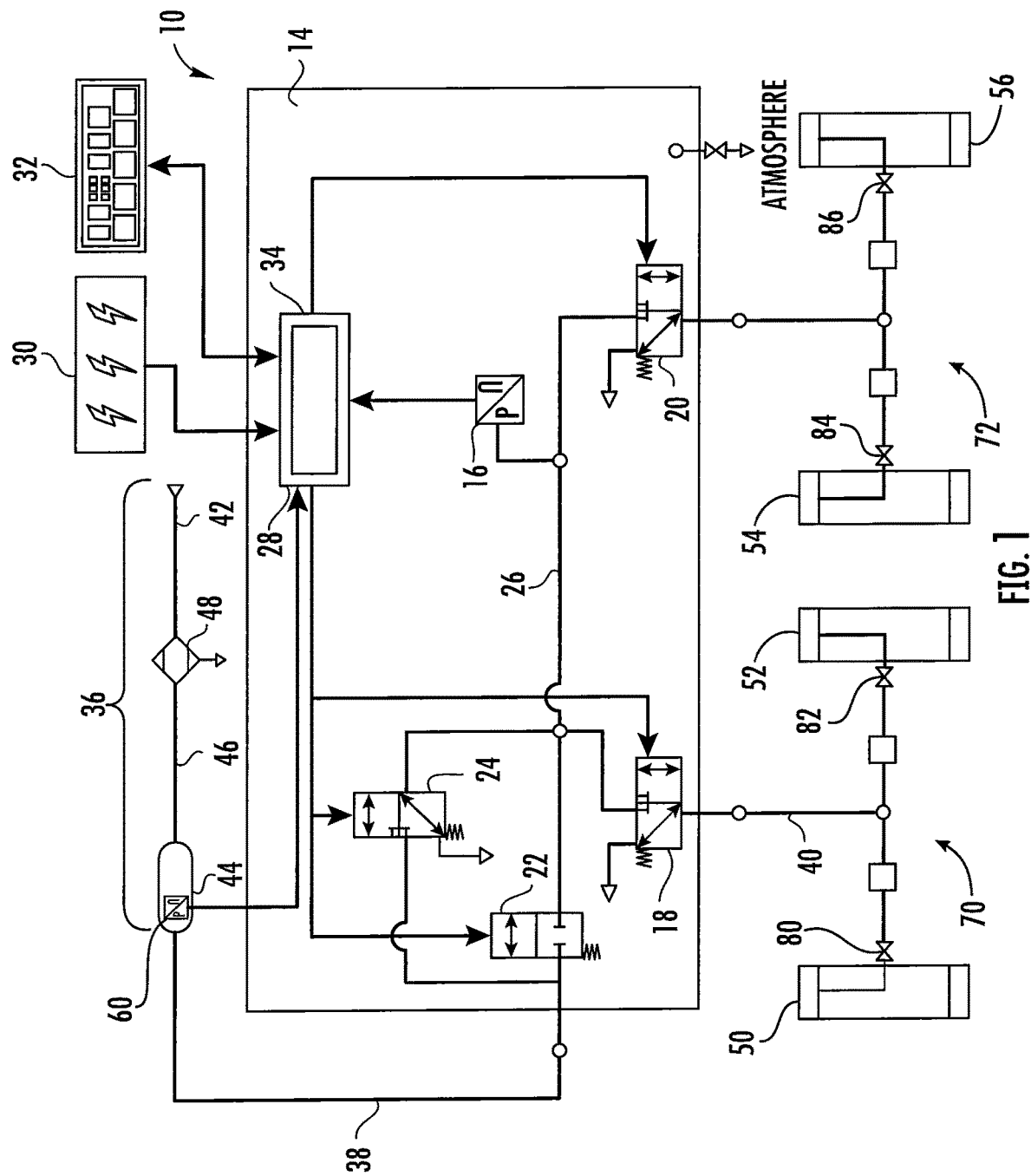
FIG. 1 depicts a schematic view of a tire inflation system according to an embodiment of the presently disclosed subject matter.

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Embodiments of a tire inflation system 10 are described below. In certain embodiments, the tire inflation system 10 is utilized with a vehicle (not depicted). The tire inflation system 10 may be a central tire inflation system (CTIS) for a commercial vehicle. In addition, the tire inflation system 10 described herein may have applications in both light duty and heavy duty-vehicles, and for passenger, off-highway, and sport utility vehicles. It would be understood by one of ordinary skill in the art that the tire inflation system 10 also has industrial, locomotive, military, agricultural, and aerospace applications.

The tire inflation system 10 is described herein with reference to a pressurized fluid such as, for example, air. The tire inflation system 10 may have inflate and/or deflate capability to allow a tire pressure to be increased and/or decreased.

As illustrated in FIG. 1, the tire inflation system 10 may comprise a control unit 14. In an embodiment, the control unit 14 comprises a plurality of valve assemblies 18, 20, 22, 24, which may be of the solenoid variety. The control unit 14 further comprises a control unit first conduit 26 in fluid communication with the valve assemblies 18, 20, 22, 24. The control unit first conduit 26 is utilized for controlling the flow of, and directing, pressurized fluid through the system 10. In an embodiment, the control unit 14 may comprise a mechatronic control unit (MCU). In another embodiment, the control unit 14 may comprise a pneumatic control unit (PCU) coupled with an electronic control unit (ECU).

As illustrated in FIG. 1, the control unit 14 comprises an electronic control portion 28. The electronic control portion 28 may receive input signals from a first pressure transducer 16, a power supply 30, and one or more additional sensors (not depicted) such as, for example, a load sensor and a speed sensor. The electronic control portion 28 may also receive input signals from an operator control device 32. The electronic control portion 28 may include a microprocessor 34 operating under the control of a set of programming instructions, which may also be referred to as software. The electronic control portion 28 may include a memory (not depicted) in which programming instructions are stored. The memory can also store identification codes, tire pressure records and/or user inputs over a period of time.

The electronic control portion 28 may output signals to the valve assemblies 18, 20, 22, 24 to open or close the valve assemblies 18, 20, 22, 24. The electronic control portion 28 may also output signals to a display device (not depicted). The display device may be included as a part of the operator control device 32 or may be included in a freestanding device.

The control unit 14 selectively communicates with an air supply 36 via an air supply circuit 38. The first pressure transducer 16 is in fluid communication with the control unit first conduit 26 and measures the pressure of the air supply 36 via the air supply circuit 38 and the control unit first conduit 26. The control unit 14 may also comprise a control valve assembly 24. The control valve assembly 24 is provided with an orifice (not depicted) which is smaller than the orifice of the supply valve assembly 22 and is utilized to provide a bleed of air from the air supply 36 to a fluid control circuit 40. In an embodiment, the supply valve assembly 22 and control valve assembly 24 are of the solenoid variety.

The air supply 36 is utilized to check the tire pressure and, if needed, increase and/or decrease the tire pressure. The air supply 36 provides storage of pressurized fluid such as, but not limited, to air or nitrogen. In an embodiment, the air supply 36 comprises an air compressor 42 attached to the vehicle. The air supply 36 may also comprise a fluid reservoir 44 such as, for example, a wet tank (also called supply tank). The compressor 42 is in fluid communication with the reservoir 44 via a supply conduit 46. The air compressor 42 supplies pressurized air to the reservoir 44 for storage therein. In certain embodiments, a drier 48 is provided between the air compressor 42 and the reservoir 44 for removing water from the air supply 36. Pressurized fluid from the air supply 36 is provided to the air supply circuit 38 via the reservoir 44. A filter (not depicted) may also be interposed in the air supply circuit 38 or the supply conduit 46.

The control unit 14 is also selectively in fluid communication with the fluid control circuit 40. The fluid control circuit 40 is utilized to provide fluid communication between the control unit 14 and one or more tire channels 70, 72. In an embodiment, first and second tires 50, 52 are in fluid communication with the first channel 70, and third and fourth tires 54, 56 are in fluid communication with the second channel 72. In an embodiment, fluid communication between the control unit 14 and fluid control circuit 40 is controlled by opening or closing a channel valve assembly 18.

Each tire 50, 52, 54, 56 contains air at a certain pressure which will hereinafter be referred to as tire pressure. In an embodiment, the tire pressure is equal to a target tire pressure. The target tire pressure can be selected to be a desired pressure. After the target tire pressure is selected, it is programmed into the control unit 14. If it is determined that the tire pressure is less than the target tire pressure, the tire pressure can be increased. If it is determined that the tire pressure is greater than the target tire pressure, the tire pressure can be decreased.

Legacy tire inflation systems utilizing a pressure switch for brake system prioritization experience performance limitations during tire inflate. When a pressure switch is closed it indicates that the availability of pressurized fluid is sufficiently greater than the brake system requirements. However, a pressure switch does not provide the information necessary to determine whether there is a sufficient pressure potential difference between the availability of pressurized fluid and a tire for increasing tire pressure during an active inflate. For example, if the pressurized fluid supply tank pressure is close to the current tire pressure and an inflate is in progress, where the target tire pressure is much higher than the current tire pressure, it would be desirable to stop the inflate activity to preserve the life of the tire inflation system components, and to resume the inflate activity after a compressor sufficiently charges the pressurized fluid supply tank.

Figure 2:
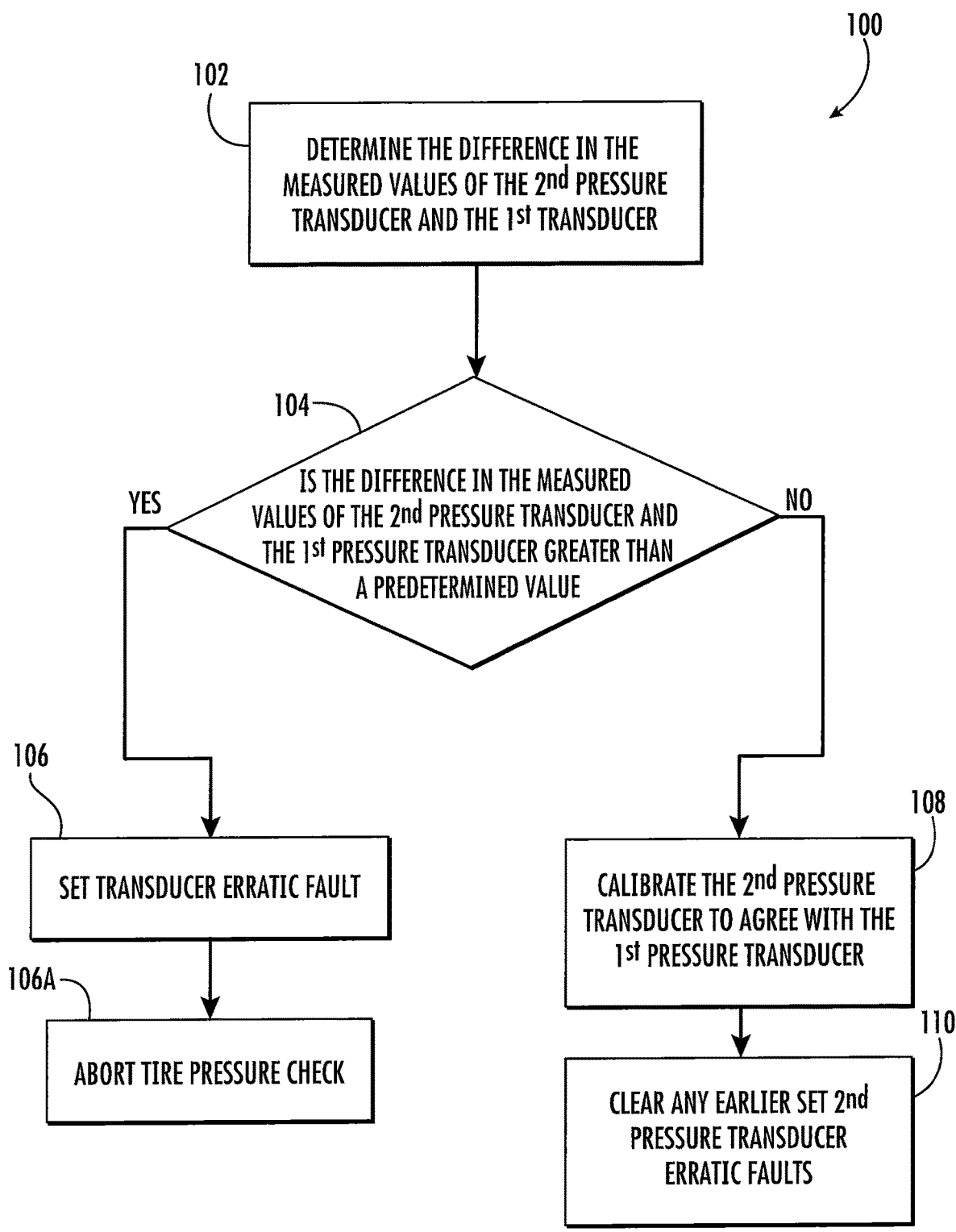
FIG. 2 depicts a flow chart of a tire pressure check algorithm having an air supply pressure transducer erratic fault activation routine according to an embodiment of the presently disclosed subject matter.

As illustrated in FIGS. 1 and 2, in an embodiment, the air supply 36 may include a second pressure transducer 60. The second pressure transducer 60 may be disposed at least partially within the reservoir 44. Further, the second pressure transducer 60 is in electrical communication with the electronic control portion 28. The second pressure transducer may be utilized to determine the exact fluid pressure in the air supply reservoir 44. With the second pressure transducer 60, the tire inflation system 10 can constantly provide the available pressure in the air supply reservoir 44.

In the tire inflation system 10, having the first and second pressure transducers 16, 60, the software of the electronic control portion microprocessor 34 may include a tire pressure check algorithm having an additional logic routine 100. The additional logic routine 100 comprises a step 102 in which the pressure in the air supply reservoir 44 is measured via the second pressure transducer 60, the pressure in the air supply reservoir 44 is simultaneously measured via the first pressure transducer 16 by activating the supply valve assembly 22 and control valve assembly 24, and any difference between the two measurements is determined.

In a step 104, the additional logic routine 100 determines whether the difference between the pressure measurements from the step 102 is greater than a maximum acceptable value. The maximum acceptable value of the difference between the pressure measurements determined in the step 102 may be previously determined based on sensor tolerances and other system considerations. In an embodiment, the maximum acceptable value of the difference between the pressure measurements determined in the step 102 may be ±3% of the measured pressure. If the difference between the pressure measurements of the first and second transducers 16, 60 is greater than the maximum acceptable value, the algorithm 100 sets a transducer erratic fault in a step 106. A transducer erratic fault may be caused by a number of electronic or pneumatic issues including, but not limited to, a faulty or loose wire between the air supply reservoir 44 and the electronic control portion 28, a faulty or loose wire between the first pressure transducer 16 and the electronic control portion 28, a blocked valve assembly 18, 20, 22, 24 in the control unit 14, and/or component deterioration of the first or second pressure transducer 16, 60.

When the erratic fault is set in the step 106, an error is communicated to the vehicle operator via a diagnostic tool/interface and the tire pressure check process is aborted to prevent the potential dumping of air supply 36 pressurized fluid to the atmosphere in a step 106A. The tire pressure check process may be resumed/re-attempted on the next tire pressure check interval. In an embodiment, the tire pressure check interval may be 15 minutes, 1 hour, etc., as programmed in the software of the electronic control portion 28. In an embodiment, the erratic fault of the step 106 may be displayed via the operator control device 32 as an indicator light (not depicted). In another embodiment, the erratic fault of the step 106 may be communicated to the vehicle operator via audio. For example, a warning tone may sound in the vehicle cabin.

If the difference between the pressure measurements of the first and second transducers 16, 60 is less than or equal to the maximum acceptable value, the additional logic routine 100 calibrates the pressure measurement of the second pressure transducer 60 to agree with the pressure measurement of the first pressure transducer 16 in a step 108. After calibrating the first and second pressure transducer offset, any set erratic fault is cleared in a step 110.

Each tire's pressure check (i.e., tire pressure measurement routine) involves drawing a small volume of pressurized air into the air supply circuit 38, the control unit first conduit 26, and the fluid control circuit 40 to open the wheel valves. After the tire pressure checks, the small volume of pressurized air is dumped to the atmosphere. In an embodiment, the pressure checks for all tires are performed simultaneously, rather than checking the pressure of a few tires and then waiting for the pressure in the air supply reservoir 44 to sufficiently recharge in order to check the pressures of the remaining tires. The tire pressure checks are performed in sequence without pauses, for lack of air supply pressure, in between successive channels. By auto-calibrating the second pressure transducer 60 such that the first and second pressure transducers 16, 60 work coherently, wait times in a tire pressure measurement routine are eliminated.

Additionally, auto-calibration of the second pressure transducer 60 with the first pressure transducer 16 eliminates a condition where the first and second transducer 16, 60 disagree within the acceptable tolerance (i.e., less than or equal to the maximum acceptable value) such that an erratic fault is not activated, but the tire pressure measurement routine becomes stuck or immobilized.

Figure 3:
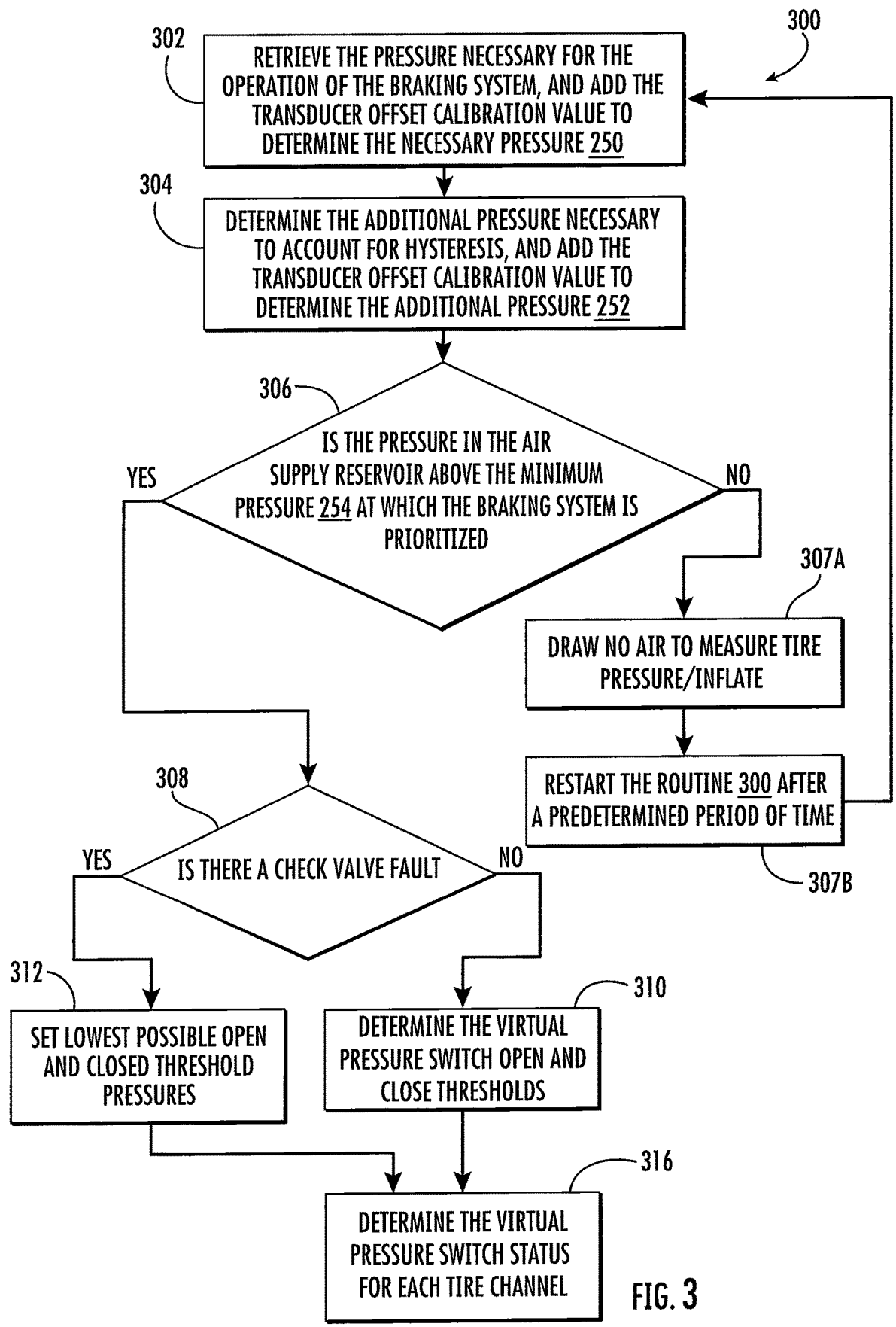
FIG. 3 depicts a flow chart of a tire inflation algorithm having a virtual pressure switch routine according to an embodiment of the presently disclosed subject matter.

As illustrated in FIG. 3, the software may include a virtual pressure switch status determination algorithm 300. The virtual pressure switch status determination algorithm 300 utilizes signals of the first and second pressure transducers 16, 60 to define a binary virtual pressure switch status for each of the tire channels 70, 72. The virtual pressure switch status is either "CLOSED" (i.e., go) or "OPEN" (i.e., no-go). The virtual pressure switch status is utilized by measure pressure and inflate algorithms to perform tire pressure checks or inflates. The virtual pressure switch status provides the need-based and availability-based go or no-go state for each channel 70, 72 to draw from the air supply reservoir 44; unlike legacy systems which only provide one state for all channels. For example, a tire 50, 52, 54, 56 or a channel 70, 72 that has a pressure very low relative to the target tire pressure may receive a CLOSED state, where another tire 50, 52, 54, 56 or a channel 70, 72 that has a pressure only marginally low relative to the target tire pressure may receive an OPEN state due to insufficient potential difference between the air supply reservoir 44 pressure and the pressure in the tires 50, 52, 54, 56.

The virtual pressure switch status determination algorithm 300 enables the electronic control portion 28 to switch between the channels 70, 72 and optimize the tire inflation system performance when the virtual pressure switch status is CLOSED for some channels and OPEN for others. The ability to perform tire pressure checks and inflate activity when the virtual pressure switch status is CLOSED for some channels and OPEN for others reduces the time necessary to achieve the target tire pressures in a scenario where multiple tires need inflation. Additionally, drawing the air supply reservoir 44 pressurized air when the virtual pressure switch status for at least one channel 70, 72 is CLOSED, rather than waiting for the virtual pressure switch status for all the channels to be CLOSED, activates the air compressor 42 governor to recharge the air supply reservoir 44 sooner. Thus, the air pressure that is eventually needed to inflate the remaining channels is available sooner, and the overall system inflate (i.e., all tires) is achieved in the shortest possible time.

The first step 302 of the virtual pressure switch status determination algorithm 300 includes determining a necessary pressure 250 in the air supply reservoir 44 that is necessary for the prioritized braking system (not depicted) to be operable. The necessary pressure 250 is a hard-limit below which the virtual pressure switch status for all situations and channels is a no-go.

A second step 304 includes determining an additional pressure 252 in the air supply reservoir 44 to account for a hysteresis band in the measurements of the first and second pressure transducers 16, 60. The additional pressure 252 is added to the necessary pressure 250 to calculate a minimum pressure 254. The hysteresis band accounts for pressure measurement of a value following an increase in pressure in the air supply reservoir 44, versus following a decrease in pressure in the air supply reservoir 44. The minimum pressure 254 is a minimum above which the virtual pressure switch status transition from OPEN to CLOSED is allowed.

In a third step 306, the virtual pressure switch status determination algorithm 300 determines whether the air supply reservoir 44 pressure is above the minimum pressure 254. Where the air supply reservoir 44 pressure is below the minimum pressure 254, in a step 307A, the braking system is prioritized, and the tire inflation system 10 draws no air to measure the pressure of or inflate the tires 50, 52, 54, 56. In a step 307B, the virtual pressure switch status determination algorithm 300 is then restarted after a predetermined period of time.

Where the air supply reservoir 44 pressure is above the minimum pressure 254, the virtual pressure switch status determination algorithm 300 looks for the presence or absence of a check valve fault in a fourth step 308. In an embodiment, the check valve fault may occur in wheel valves 80, 82, 84, 86. The check valve fault may be established in a different software module.

In an embodiment, the check valve fault is determined by the ratio of the pressure measured in the fluid control circuit 40 for a predefined duration when the control valve assembly 24 is ON, versus when both the supply valve and control valve assemblies 22, 24 are ON. The pressurized air measured in the control unit 14 is a result of air flow from the air supply 36 side in both the control valve assembly 24 ON, and supply and control valve assembly 22, 24 ON cases. In a scenario where there is a check valve failure, air also flows from the tire 50, 52, 54, 56 side (i.e., both sides of the control unit 14). Air flowing into the control unit 14 from the tire 50, 52, 54, 56 side skews the expected ratio of the pressure measured in the fluid control circuit 40, and the presence or absence of a check valve fault is detected.

Check valve failure is a serious condition; therefore the check valve fault software module may utilize any air available until the air supply reservoir 44 pressure decreases to the necessary pressure 250 for the prioritized braking system. The air available to the check valve fault software module does not include any additional pressure 252 for hysteresis, accuracy, system timing performance, etc., as safety of the vehicle takes precedence in all situations. Where a check valve open fault is set, a tire pressure measurement event is triggered sooner rather than later. For example, if in normal conditions tire pressure was checked every 15 minutes, when a check valve open fault is active tire pressure may be checked every 2 minutes to ensure that tires do not go flat. In an embodiment, the control valve assembly 24 may be turned ON to close the vent to atmosphere when the check valve fault is active, such that tire pressure is contained in the control unit 14 and is not lost to atmosphere.

In legacy tire pressure measurement algorithms, a check valve poppet stuck due to debris in the tire inflation system may cause a continuous dump of pressurized air from the air supply reservoir 44 until the pressure in the reservoir 44 reaches a minimum pressure. This same phenomenon may occur where there exists any plumbing leakage between the air supply reservoir 44 and the control unit 14. The tire inflation system 10 provides protection from a stuck solenoid poppet dumping air supply fluid to atmosphere in the step 106A discussed supra. When a check valve poppet is stuck, and air supply is dumped to atmosphere, the air supply pressure measured by the first and second pressure transducers 16, 60 differs beyond an acceptable value. An erratic fault is activated, the pressure check is aborted, and the safety goal is achieved.

If the fourth step 308 determines that there is not a check valve fault, a step 310 is utilized to determine the virtual pressure switch OPEN and CLOSE thresholds during tire inflation. The first and second pressure transducer 16, 60 offset calibration value determined in step 108 is included in the virtual pressure switch OPEN and CLOSED threshold values. Once it is ensured that there is sufficient pressure for operation of the braking system, target tire pressure may be utilized to define the OPEN and CLOSED thresholds. In an embodiment, the virtual pressure switch OPEN threshold is equal to the necessary pressure 250 plus the transducer offset calibration value. In an embodiment, the virtual pressure switch CLOSED threshold may be equal to the necessary pressure 250 plus the transducer offset calibration value, plus the additional pressure 252.

In an embodiment having a check valve based system, air supply reservoir 44 pressure that is higher than the tire pressure would be required to open the channel valve assembly 18, 20. The target pressures for front channel tires may be setup differently than rear channel tires. Therefore, it is possible that one set of tires has an OPEN status while the other set of tires has a CLOSED status. For example, one tire pressure may be very low (e.g., due to a puncture) and have a CLOSED status, while another tire has an OPEN status because its last known pressure was much higher (i.e., the air supply reservoir 44 pressure is inadequate to open that channel's valve 18, 20).

As described supra, the virtual pressure switch status provides the tire inflation system the opportunity to measure the pressure in, or inflate, one channel while waiting on another channel. This channel differentiation also activates the governor on the air compressor 42 to recharge the air supply reservoir 44 such that pressurized air is available more often. After the step 310, the virtual pressure switch status determination algorithm 300 determines the virtual pressure switch status for each tire channel in a step 316. In an embodiment, the virtual pressure switch status for each channel 70, 72 is based on the respective target tire pressure and the last known measured tire pressures.

If the fourth step 308 determines that there is a check valve fault, a step 312 sets the lowest possible threshold pressure in the air supply reservoir 44 for the virtual pressure switch OPEN and CLOSED threshold. In an embodiment, the lowest possible threshold pressure is the necessary pressure 250. After a predetermined period of time, the tire inflation system 10 reinitiates the virtual pressure switch status determination algorithm 300.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed is:

1. A method of tire inflation, comprising:
providing a control unit having a first pressure transducer, wherein said control unit is in selective fluid communication with one or more channels;
providing a fluid reservoir in fluid communication with said control unit via an air supply circuit;
providing a second pressure transducer disposed at least partially within said fluid reservoir;
determining a first pressure in said fluid reservoir necessary to operate a braking system, wherein said first pressure includes a transducer offset calibration value;
determining a second pressure in said fluid reservoir to account for a hysteresis band in measurements of said first and second pressure transducers, wherein said second pressure includes said transducer offset calibration value;
calculating a third pressure via adding said first and second pressures;
determining whether said fluid reservoir pressure is greater than said third pressure;
determining virtual pressure switch OPEN and CLOSED threshold values where no check valve fault has been set;
determining a virtual pressure switch status for each of said one or more channels; and
inflating one or more tires of said one or more channels having a CLOSED virtual pressure switch status.

2. The method of tire inflation according to claim 1, further comprising:
setting said virtual pressure switch OPEN threshold value to a lowest possible threshold value where a check valve fault has been set.

3. The method of tire inflation according to claim 2, further comprising:
aborting said virtual pressure switch status determination; and
determining whether said check valve fault has been cleared after a period of time.

4. The method of tire inflation according to claim 1, wherein:
said lowest possible threshold value is equal to said first pressure.

5. The method of tire inflation according to claim 1, wherein determining said check valve fault status comprises:
providing said control unit with a control valve in fluid communication with a fluid control circuit;
providing said control unit with a supply valve in fluid communication with said air supply circuit;
determining a first pressure measured in said fluid control circuit for a predetermined period of time when said control valve is open and said supply valve is closed;
determining a second pressure measured in said fluid control circuit for a predetermined period of time when said control valve is open and said supply valve is open;

determining a ratio of said first and second fluid control circuit pressures; and comparing said determined ratio with an expected ratio.

6. The method of tire inflation according to claim 1, wherein determining said virtual pressure switch OPEN threshold value comprises:

adding said first pressure and said transducer offset calibration value.

7. The method of tire inflation according to claim 1, wherein determining said virtual pressure switch CLOSED threshold value comprises:

adding said first pressure, said second pressure, and said transducer offset calibration value.

\* \* \* \* \*